No. 722,259. PATENTED MAR. 10, 1903.
F. H. SLEEPER.
ENGINE.
APPLICATION FILED JULY 18, 1902.

NO MODEL.

Witnesses.
Lloyd Blackmore
May Madden

Inventor.
F. H. Sleeper
by Fetherstonhaugh & Co.
Attys.

UNITED STATES PATENT OFFICE.

FRANK HENRY SLEEPER, OF MONTREAL, CANADA.

ENGINE.

SPECIFICATION forming part of Letters Patent No. 722,259, dated March 10, 1903.

Application filed July 18, 1902. Serial No. 116,112. (No model.)

*To all whom it may concern:*

Be it known that I, FRANK HENRY SLEEPER, a subject of the King of Great Britain, residing at Montreal, in the district of Montreal, Province of Quebec, Canada, have invented certain new and useful Improvements in Engines, of which the following is a specification.

My invention relates to improvements in engines, and particularly to the joints or hinges of an engine in which blades or fans are the medium through which the shaft is rotated; and the object of the invention is to provide a bearing for the joints or hinges in an engine of the particular class whereby the lubrication of the joints by the steam will be greatly facilitated and the cutting of the metal absolutely prevented and at the same time provide a perfectly steam-tight joint with no possibilities of stiffness in the working; and it consists, essentially, of a plurality of rollers or balls inserted in the joint or hinge at that part thereof wherein the greatest pressure exists during the operation and a packing-strip arranged in a slot extending the full width of the bearing, the various parts being constructed in detail as hereinafter more particularly described.

Figure 1:
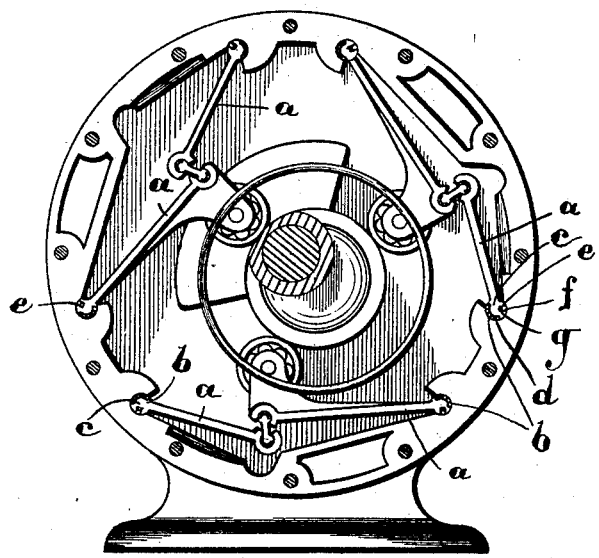
Figure 2:
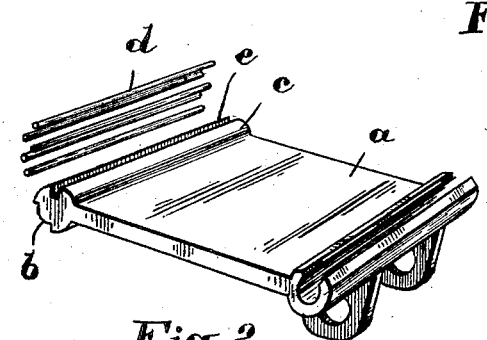
Figure 3:
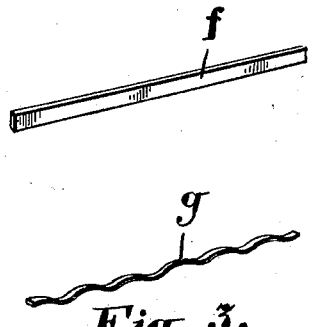

Figure 1 is a perspective view of an engine, showing the blades hinged to the casing. Fig. 2 is a detail of a blade, showing the rollers removed. Fig. 3 is a detail of a packing-strip and spring.

Like letters of reference indicate corresponding parts in each figure.

$a$ is the blade, and $b$ the depression in the hinged portion $c$, designed to receive the rollers $d$.

$e$ is the packing-strip slot cut out of the hinged portion $c$, parallel to the depression $b$.

$f$ is the packing-strip, extending from end to end of the joint in the slot $e$.

$g$ is a flat spring resting under the packing $f$ in the slot $e$.

The depression $b$ preferably extends the full length of the hinged portion $c$, while its width circumferentially is limited to that part of the hinge which has the greatest bearing-pressure on the socket during the forward movement of the blade caused by the expansion of the steam or other expansile fluid.

The hinge or joint with the bearings introduced, as described, is not intended to be steam-tight without the packing-strip $f$. This packing-strip, as before explained, occupies the full length of the joint and is parallel to the depression $b$. The remainder of the peripheral surface of the hinged portion $c$ is designed to fit snugly to the socket, though not so close as to render stiff the operation of the blade, for it will be understood that the packing-strip thus introduced effectually bars the passage of steam around and through the joint. A salient feature is the facility with which it can be lubricated by the steam. This lubrication is essential to the operation of the hinge, and as the peripheral surfaces of the hinge and the socket do not abut each other too closely the metal is much preserved and prevented from cutting.

The difficulty experienced in the successful operation of this class of engine has been, as far as I am aware, in some cases occasioned by the joints becoming useless through the cutting of the metal, and consequently rendering the engine valueless. Therefore the introduction of the bearings in a depression either in the hinged portion of the blade or in the peripheral surface of the socket and the provision of packing to keep the joint tight effectually overcome the difficulty hitherto known.

It must be understood that the depression for the bearings may be either in the peripheral surface of the socket or the peripheral surface of the hinge, though it is preferable to have it in the hinge, and also any suitable form of bearings may be inserted in the depression other than those illustrated.

What I claim as my invention is—

1. In an engine, the combination with the frame having a socket internally arranged, of a blade having a hinged portion at one end thereof, designed to turn in the aforesaid socket, a plurality of rollers or balls recessed between the hinge portion of the blade and the socket at the point of greatest pressure in the bearing, as and for the purpose specified.

2. In an engine, the combination with the frame having a socket internally arranged thereacross, of a blade having a hinged portion at one end thereof designed to turn in the aforesaid socket, a plurality of rollers placed in a longitudinal depression in the said hinged portion and located circumferentially at the point of greatest pressure in the bearings, a packing-strip resting on a suitable spring in a slot in the hinged portion parallel to the depression, as and for the purpose specified.

3. In a device of the class described, a hinged blade designed to turn in a socket, a plurality of rollers introduced into a depression in the hinged portion of the blade at the point of greatest pressure in the bearing, as and for the purpose specified.

4. In a device of the class described, a steam-tight hinge and joint comprising an elongated circularly-shaped hinge designed to fit into a correspondingly-shaped socket, a plurality of rollers recessed therein between at the point of greatest pressure in the bearing, a packing-strip located in a slot and extending the full length of the hinge parallel to the rollers, as and for the purpose specified.

5. In a device of the class described, a steam-tight hinge and joint comprising an elongated hinge designed to turn in a corresponding socket, a plurality of balls or rollers suitably recessed at the point of greatest pressure between the hinge and socket, a packing-strip extending the full length of the hinge and located at the point of least pressure in the bearing, as and for the purpose specified.

Signed at Montreal, in the district of Montreal, in the Province of Quebec, Canada, this 16th day of July, 1902.

FRANK HENRY SLEEPER.

Witnesses:
LLOYD BLACKMORE,
MAY MADDEN.